US006625760B1

(12) United States Patent
Man et al.

(10) Patent No.: US 6,625,760 B1
(45) Date of Patent: Sep. 23, 2003

(54) APPARATUS AND METHOD FOR GENERATING RANDOM TESTS FOR PROGRAM VALIDATION USING GENETIC EVOLUTION

(75) Inventors: Richard F. Man, Palo Alto, CA (US); Umesh Krishnaswamy, Milford, CT (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/368,019

(22) Filed: Aug. 3, 1999

(51) Int. Cl.$^7$ .................................................. G06F 11/00
(52) U.S. Cl. .............................. 714/33; 714/32; 706/13
(58) Field of Search .............................. 714/26, 32, 33, 714/38; 706/13

(56) References Cited

U.S. PATENT DOCUMENTS

| | | | | | |
|---|---|---|---|---|---|
| 4,935,877 A | * | 6/1990 | Koza | ............................ | 706/13 |
| 5,136,686 A | * | 8/1992 | Koza | ............................ | 706/13 |
| 5,394,509 A | * | 2/1995 | Winston | ....................... | 706/13 |
| 5,708,774 A | * | 1/1998 | Boden | ........................... | 706/13 |
| 5,729,623 A | * | 3/1998 | Omatu et al. | ................ | 382/135 |
| 5,742,738 A | * | 4/1998 | Koza et al. | ................... | 706/13 |
| 5,754,760 A | * | 5/1998 | Warfield | ....................... | 714/35 |
| 5,764,857 A | * | 6/1998 | Suzuki | .......................... | 706/13 |
| 5,780,789 A | * | 7/1998 | Tsuji | ............................ | 187/380 |
| 5,781,698 A | * | 7/1998 | Teller et al. | .................... | 706/13 |
| 5,805,795 A | * | 9/1998 | Whitten | ......................... | 714/32 |
| 6,058,385 A | * | 5/2000 | Koza et al. | .................... | 706/13 |
| 6,088,690 A | * | 7/2000 | Gounares et al. | .............. | 706/13 |
| 6,282,527 B1 | * | 8/2001 | Gounares et al. | .............. | 706/13 |
| 6,304,833 B1 | * | 10/2001 | Ferkinhoff et al. | ........... | 324/345 |

OTHER PUBLICATIONS

Melanie Mitchell, "An Introduction to Genetic Algorithms", 1999, Massachussetts Institute of Technology, Chapters 1.3, 1.5, 1.6, and 5.4.*

* cited by examiner

*Primary Examiner*—Robert Beausoliel
*Assistant Examiner*—Gabriel L. Chu

(57) ABSTRACT

Apparatus and method are described for a testing system that generates tests that share similar failure causing characteristics that can be discovered by a genetic generator quickly without going through the chance or long process of traditional random and exhaustive test generations. The testing system generates random test cases that are applied to a system under test (SUT). These tests are validated to determine whether they cause errors within the SUT. All testing programs that cause an error during the execution of the SUT are collected and are used in the genetic algorithm technique to create other testing programs that share similar characteristics.

16 Claims, 8 Drawing Sheets

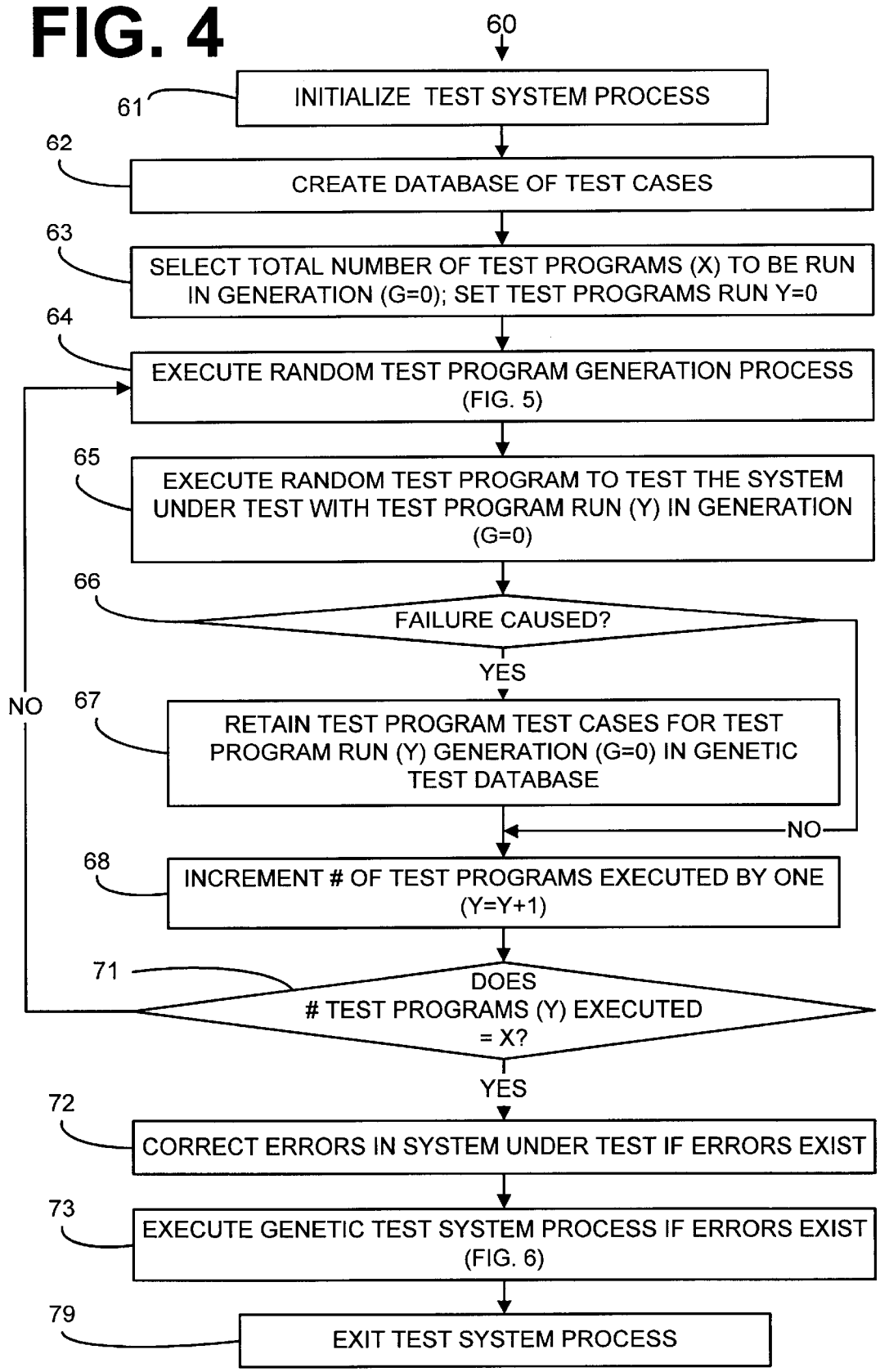

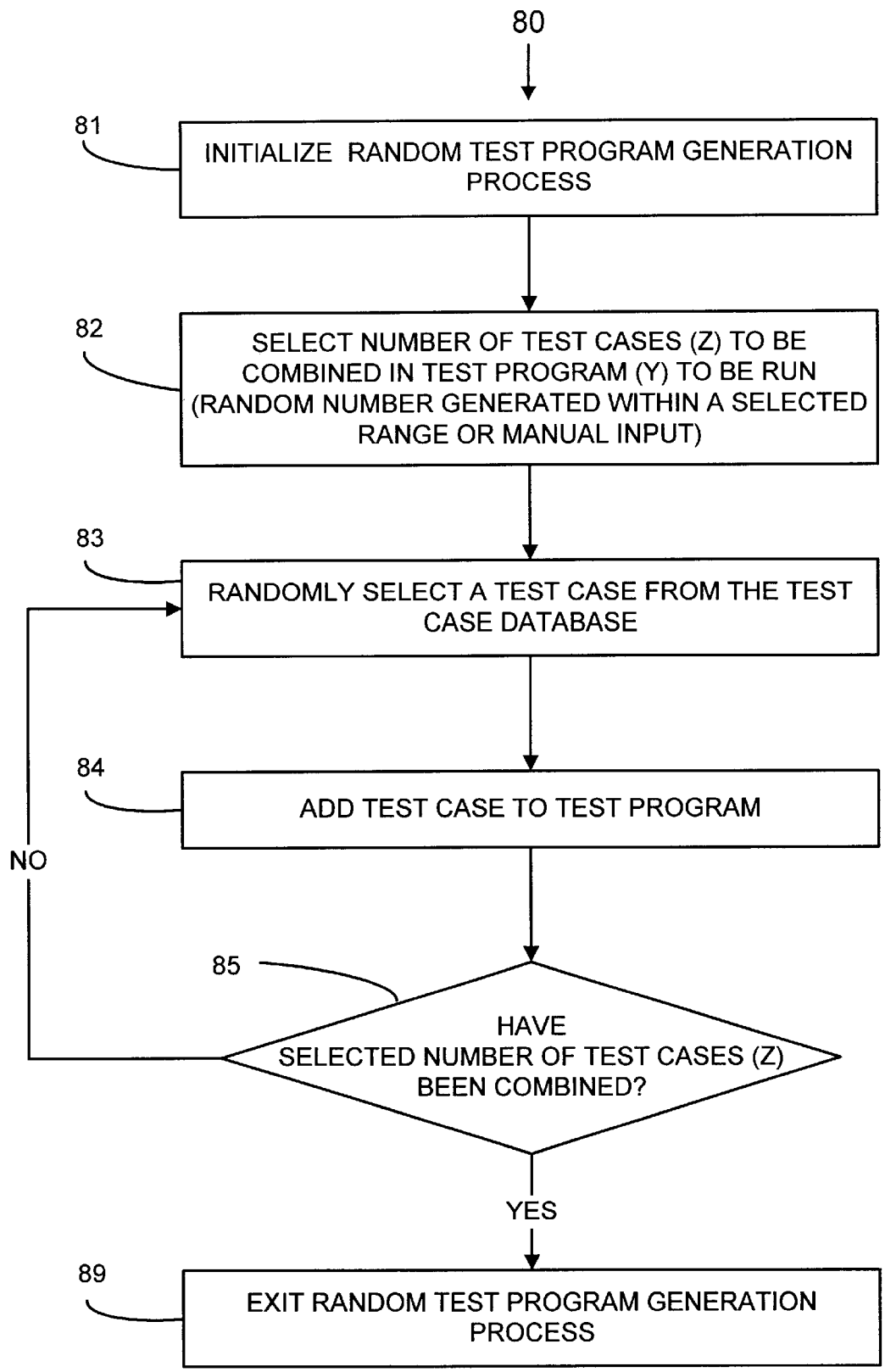

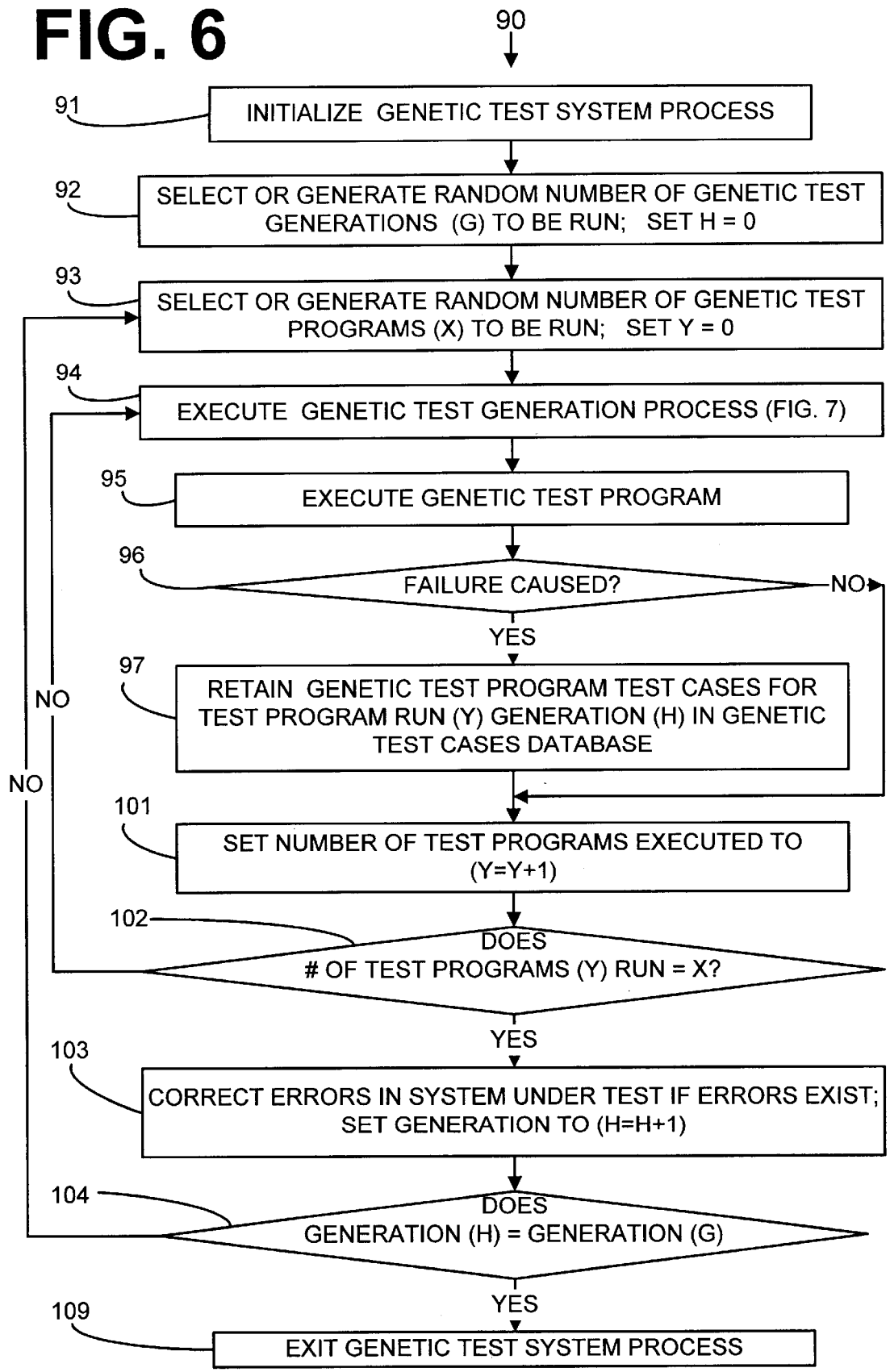

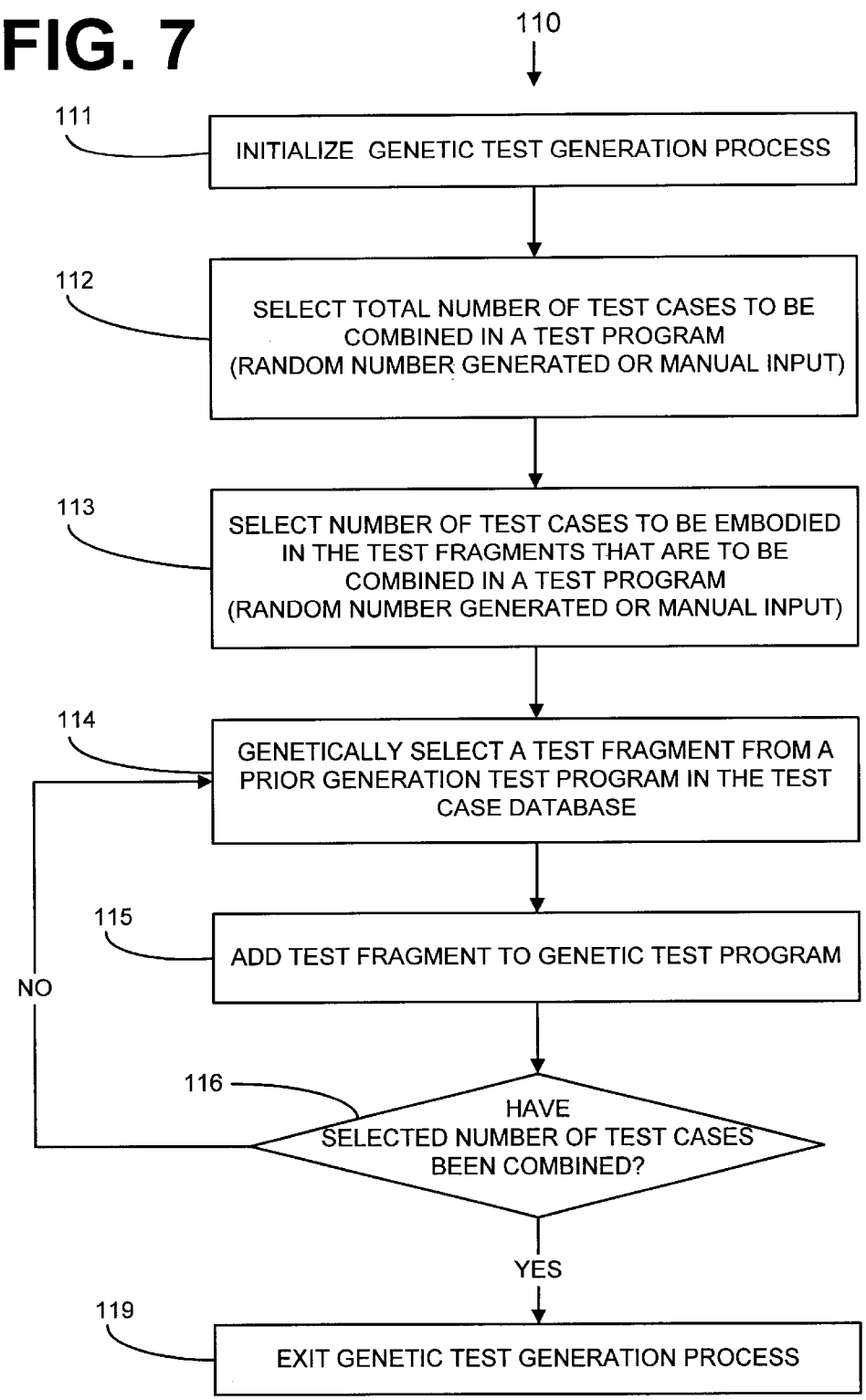

FIG. 8A

| TEST PROGRAM 1 GENERATION 1 120 | | | | | |
|---|---|---|---|---|---|
| A 121 | B 122 | C 123 | D 124 | E 125 | F 126 |

| TEST PROGRAM 2 GENERATION 1 130 | | | | | |
|---|---|---|---|---|---|
| AA 131 | BB 132 | CC 133 | DD 134 | EE 135 | FF 136 |

| TEST PROGRAM X-1 GENERATION 1 140 | | | | | |
|---|---|---|---|---|---|
| U 141 | V 142 | W 143 | X 144 | Y 145 | Z 146 |

| TEST PROGRAM X GENERATION 1 150 | | | | | |
|---|---|---|---|---|---|
| UU 151 | VV 152 | WW 153 | XX 154 | YY 155 | ZZ 156 |

FIG. 8B

| TEST PROGRAM 1 GENERATION 2 160 | | | | | |
|---|---|---|---|---|---|
| TEST FRAGMENT 167 | | | TEST FRAGMENT 168 | | |
| A 161 | B 162 | C 163 | DD 164 | EE 165 | FF 166 |

FIG. 8C

| TEST PROGRAM 2 GENERATION 2 170 | | | | | |
|---|---|---|---|---|---|
| TEST FRAGMENT 177 | | | TEST FRAGMENT 178 | | |
| AA 171 | BB 172 | CC 173 | D 174 | E 175 | F 176 |

FIG. 8D

| TEST PROGRAM 3 GENERATION 2 180 | | | | | |
|---|---|---|---|---|---|
| TEST FRAGMENT 187 | | TEST FRAGMENT 188 | | TEST FRAGMENT 189 | |
| U 181 | V 182 | CC 183 | DD 184 | E 185 | F 186 |

FIG. 8E

| TEST PROGRAM 4 GENERATION 2 190 | | | | | |
|---|---|---|---|---|---|
| TEST FRAGMENT 198 | | TEST FRAGMENT 199 | | TEST FRAGMENT 200 | | |
| YY 191 | ZZ 192 | A 193 | B 194 | D 195 | E 196 | F 197 |

FIG. 8F

| TEST PROGRAM 5 GENERATION 2 210 | | | | | |
|---|---|---|---|---|---|
| TEST FRAGMENT 217 | | TEST FRAGMENT 218 | | TEST FRAGMENT 219 | |
| CC 211 | DD 212 | C 213 | GG 214 | M 215 | XX 216 |

APPARATUS AND METHOD FOR GENERATING RANDOM TESTS FOR PROGRAM VALIDATION USING GENETIC EVOLUTION

BACKGROUND OF THE INVENTION

1. Field of the Invention

The present invention generally relates to an apparatus and method for providing efficient and exhaustive testing for system validation. More particularly, using an application of evolution (applying an application of a genetic algorithm) in the testing programs to find a new population of testing programs that will be better than the prior generation of testing programs. The new population of testing programs use the parent generation of test programs that are found to cause failures in the system under test.

2. Description of Related Art

As is known in the computer and software arts, when a software program is developed, it will contain errors. As a consequence, developers of the software program utilize many techniques to check the correctness of the program and to diagnose errors.

It is known in the art that a way of verifying any system under test is just to operate it in some representative situation and verify the behavior of the system under test is as expected. In general, it is practically impossible to test a system under test under all possible operating conditions. Thus, it is necessary to find some suitable test cases that provide enough evidence that the desired behavior will be exhibited in all the remaining cases. This is often difficult to accomplish.

Two common methods in producing program tests are to 1) generate the program tests exhaustively and 2) to generate the program tests randomly. For example, if a program is a calculator program, then exhaustive testing would provide all valid input and then check if all the calculations are correct. Random testing would provide a random input and check if the calculations are correct. Truly exhaustive testing is usually impractical since the set of valid inputs for a program is usually infinite. In either case, the actual output is checked against the expected output (which may be produced by human operation or another program). Any differences between the expected and actual output indicate a potential problem with the program or reference.

It is known in the art that the only testing of any system under test that can provide absolute certainty about the correctness of the system under test's behavior is exhaustive testing (i.e., testing the system under all possible circumstances). Unfortunately, such testing can never be performed in practice. Thus, there is the need for testing strategies, i.e., some criterion for selecting significant test cases, that will provide the most complete testing.

A significant test case is one which has a high potential to uncover the presence of an error. Thus, successful execution of a significant test case increases the programmer's confidence of the correctness of the program. Intuitively, rather than running a large number of test cases, the goal in testing should be to run a number of significant test cases that are representative of all the possible test conditions. If a significant test case set is a super set of another significant test set, one can then rely more on the super set of another significant test set. On the other hand, since testing is costly in both man-hours and machine-time, it is the object of the programmer to limit the number of possible experiments.

Heretofore, software developers have lacked an apparatus and method to accomplish program testing in an efficient way.

SUMMARY OF THE INVENTION

To achieve the advantages and novel features, the present invention is generally directed to an apparatus and method for generating random tests that share similar characteristics and that can be discovered by a genetic generator quickly without going through the chance or long process of traditional random and exhaustive generations. This allows the testing system to generate random test cases that are applied to the system under test (SUT). These random tests are validated to see if they cause errors within the SUT. All test programs that cause an error during the execution of the SUT are collected and are used in the application of a genetic algorithm to create other testing programs that share similar characteristics.

The present invention further utilizes an apparatus and method that includes an evolution technique. The genetic testing program starts with an initial population of test cases. Test cases in test programs that cause failures in the system under test are saved to form a new population of test programs with test cases that share similar.characteristics.

This is motivated by the concept that the new population of test programs will trigger more failures than the old population of test programs. Test cases from test programs that cause failures in the SUT are selected to form the new testing programs (offspring) according to their fitness (i.e., that they will have a higher chance of finding more failures in the system under test).

BRIEF DESCRIPTION OF THE DRAWINGS

The accompanying drawings incorporated in and forming a part of the specification illustrate several aspects of the present invention, and together with the description, serve to explain the principles of the invention. In the drawings:

FIG. 4 is a flow chart of the preferred method to perform first case generation of population zero of the present invention.

FIG. 5 is a flow chart of the process that randomly generates a test case for a test program within population zero of the present invention.

FIG. 6 is a flow chart of the preferred method to perform the genetic testing using test cases from population one (1) and on.

FIG. 7 is a flow chart of the process that creates the test cases for subsequent population with test fragments obtained from previous test cases that have discovered errors in the test program.

FIG. 8A is a block diagram representative of the parent test programs generated using the random test case generation method of the present invention.

FIGS. 8B–8F are representative of test fragments within test programs generated by utilizing the genetic evolution techniques of the present invention.

FIG. 8B is a block diagram representative of a child test program inheriting test fragments from parent programs 1 and 2.

FIG. 8C is a block diagram representative of the child test program inheriting test fragments from test program 2 and test program X-1.

FIG. 8D is a block diagram representative of the child test program inheriting test fragments from parents test program 1, test program 2, and test program X-1.

FIG. 8E is a block diagram representative of a child test program inheriting test fragments from parent's test program X and program 1.

FIG. 8F is a block diagram representative of a child test program inheriting test fragments from parent test program 1, test program 2, including a mutation of those parent test programs.

DETAILED DESCRIPTION OF THE PREFERRED EMBODIMENT

Figure 1:
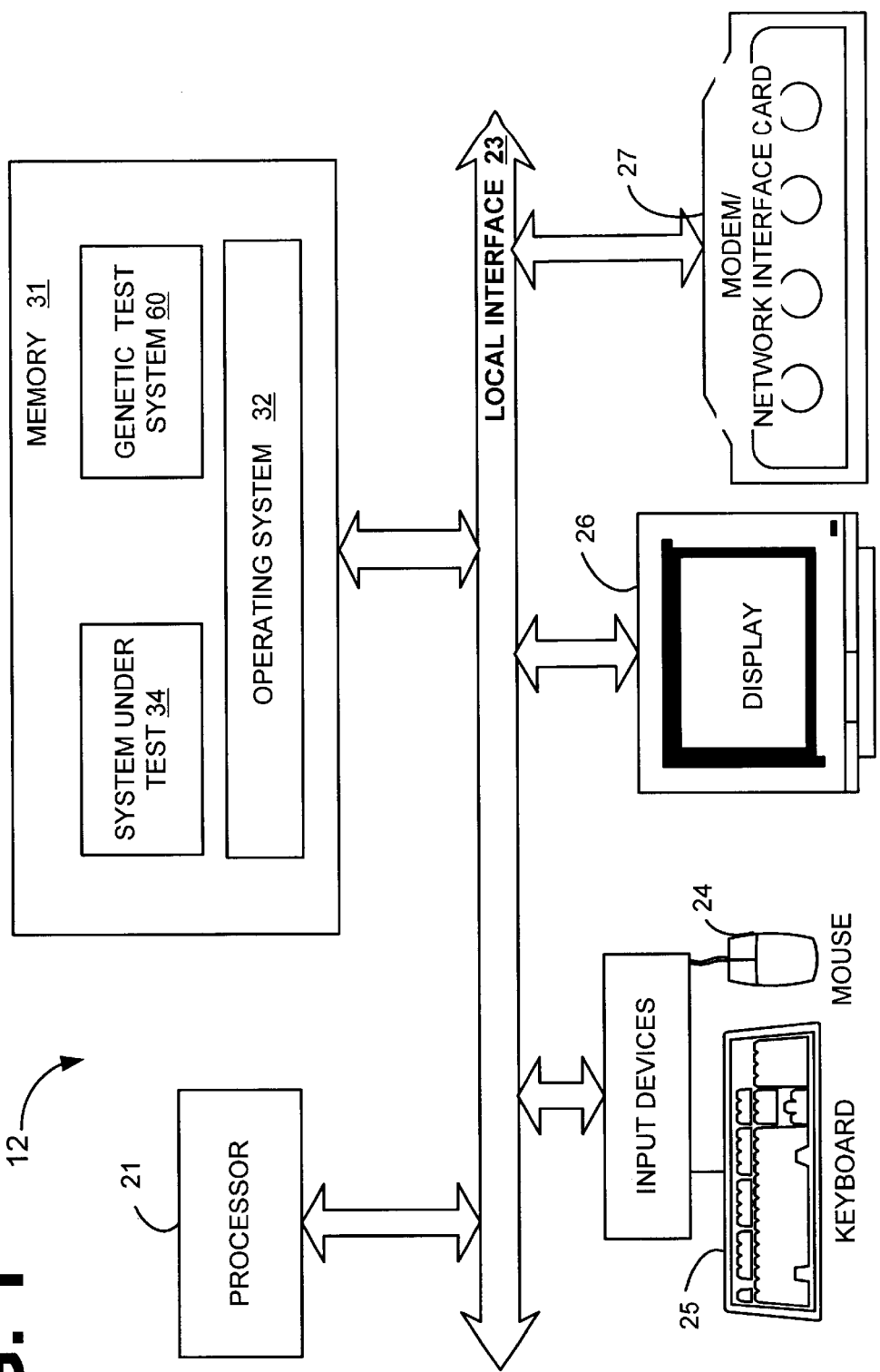
FIG. 1 is a block diagram of a computer system showing the genetic test system of the present invention and the SUT within the memory area.

Reference will now be made in detail to the description of the invention as illustrated in the drawings. Although the invention will be described in connection with these drawings, there is no intent to limit it to the embodiment or embodiments disclosed therein. On the contrary, the intent is to include all alternatives, modifications, and equivalents included within the spirit and scope of the invention as defined by the appended claims.

As illustrated in FIG. 1, shown is a computer system 12 generally comprising a processor 21, and a memory 31 with an operating system 32. The processor 21 accepts data from memory 31 over a local interface 23, such as a bus(es). The memory 31 can be either one or a combination of the common types of memory, for example, but not limited to, erasable programmable read only memory (EPROM), electronically erasable programmable read only memory (EEPROM), flash memory, programmable read only memory (PROM), random access memory (RAM), read only memory (ROM), flash memory, dynamic random access memory (DRAM), Static random access memory (SRAM), system memory, or the like. The memory 31 may also include either one or a combination of nonvolatile memory, such as disk drives, tape drives, CDROM drives, cartridges, cassettes, or memory located on a network server. Direction from the user can be signaled by using the input devices, for example, but not limited to, mouse 24 and keyboard 25. The action input and result output may be displayed on a display terminal 26.

Stored in the memory 31 is the genetic test system 60 which is the system that performs the testing of the system under test. The genetic test system 60 can be implemented in hardware, software, firmware, or a combination thereof. In the preferred embodiments, the genetic test system 60 is implemented in software or firmware that is stored in a memory and that is executed by a suitable execution system such as, but is not limited to, processor 21. In the preferred embodiment, the system under test (SUT) 34 can be combination of software and hardware. In another embodiment, the SUT 34 can be standalone hardware. Utilizing the modem or network interface card 27, allows the SUT 34 to be tested as standalone hardware from a remote site.

Figure 2:
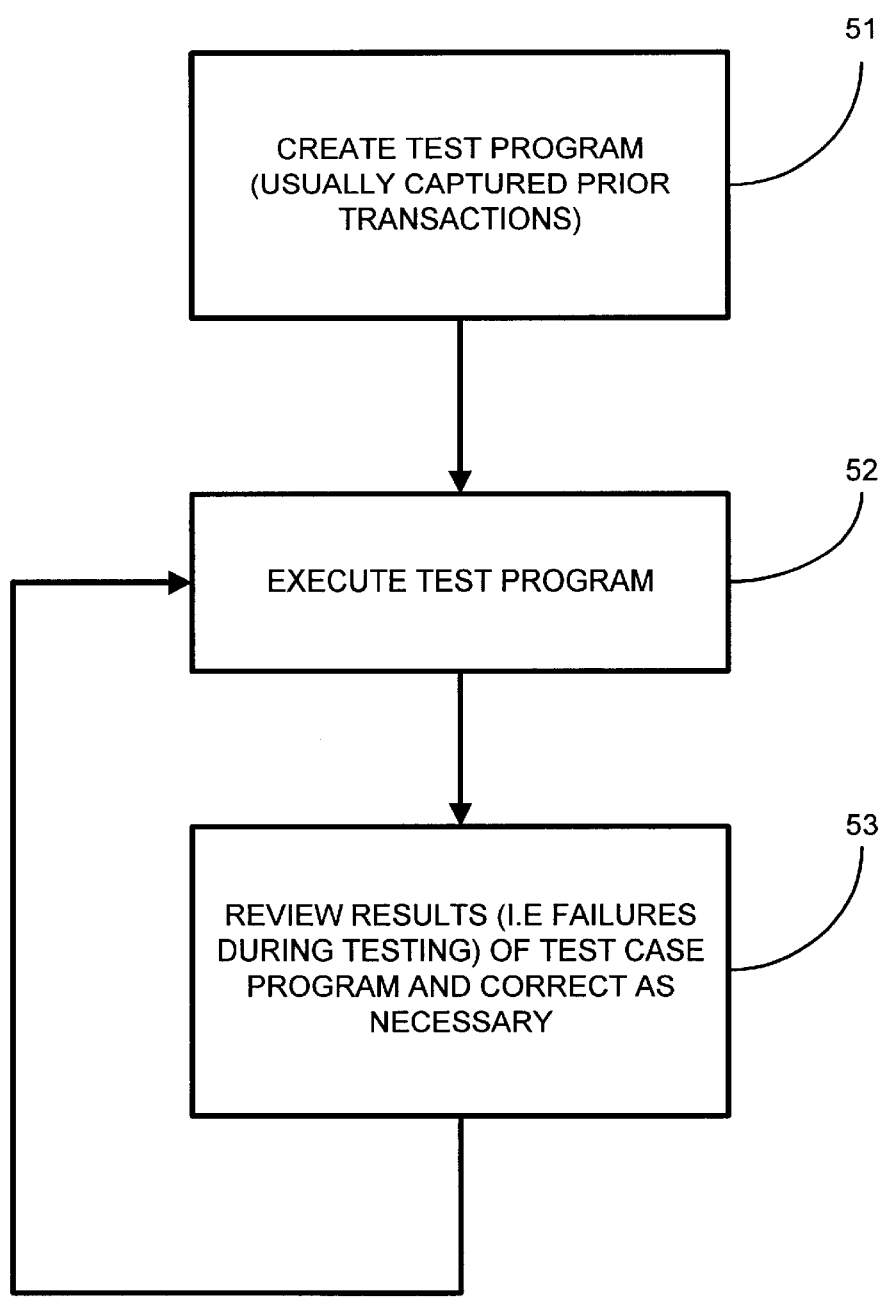
FIG. 2 is a flow chart of a well-known prior art method to perform program testing.

Illustrated in FIG. 2 is the prior art methodology for testing a system under test. First, a test program is created at step 51. These test programs generally contain test cases that test various functional units of the SUT (whitebox tests) or are representative transactions of the SUT (blackbox tests).

Next, the test program is executed at step 52. The test program is generally a program that includes test cases to test individual component operations within the system under test (SUT) 34. Then, after execution of the test program at step 52, the results are reviewed to identify failures that occurred in the SUT 34 during execution of the test program at step 52. The programmer then corrects SUT 34 as necessary at step 53, and then repeats steps 52 and 53 as required. Typically, the test program consists of static test cases.

Figure 3:
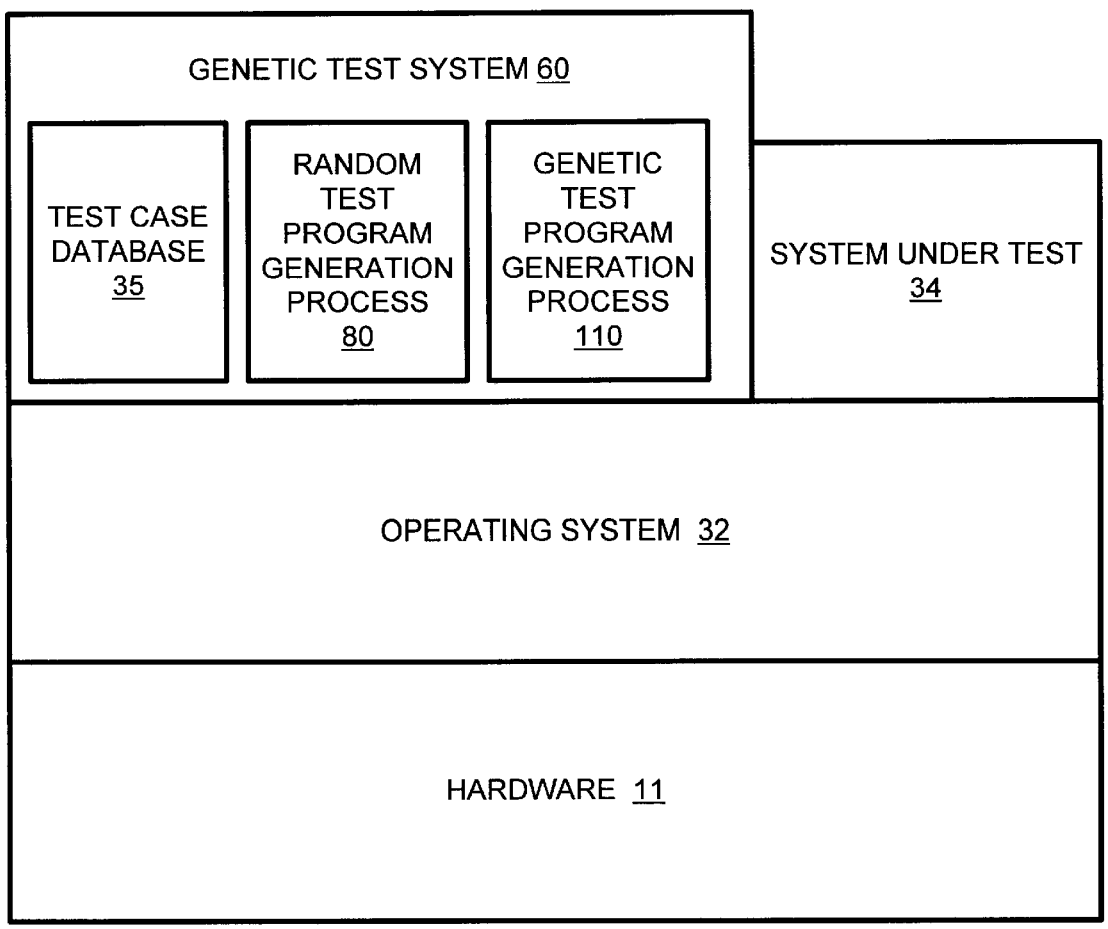
FIG. 3 is a block diagram illustrating the hierarchy of the hardware, operating system, SUT, and genetic test program of the present invention.

Illustrated in FIG. 3 is a block diagram of the architecture of the present invention. As shown, the hardware 11 interacts with the operating system 32. The operating system 32 provides for the interaction between the SUT 34, the genetic test system 60 of the present invention, and with the hardware 11. However, it is understood that the SUT 34 could also be a new operation system or a program code that interacts directly with the hardware. The genetic test system 32 provides for interaction between the test case database 35, random test program generation process 80, and the genetic test program generation process 110. While the preferred embodiment shows the test case database 35 contained within the genetic test system 60, it is also contemplated that the test case database 35 can be a stand-alone system.

Illustrated in FIG. 4 is a flow chart representative of the genetic test system 60 of the present invention. First, the genetic test system 60 process is initialized at step 61. The initialization step 61 establishes the initial values and data structures in the genetic test system 60. The initialization step 61 can also establish the environment for the genetic test system 60 to operate within, such as for example but not limited to, a stand-alone computer system, or within in a computer network.

A database of test cases is created next at step 62. The creation of the test cases database can, for example but not limited to, include test cases that are derived from real world input data to the program being tested. The test cases included in the database can also be the results of randomly generated inputs for the SUT 34. Test cases are defined below with reference to FIGS. 8A through 8F.

The test programs depicted in the block diagrams of FIGS. 8A through 8F are representative of examples of test cases within the test fragments of each program. As applied herein, a test case is defined to include input data to be processed by the system under test 34, and in some cases may include state data to place the system under test 34 into a particular state. A test fragment is the combination of a set of test cases. A test program is a collection of test fragments, each test fragment comprising a set of test cases. (An analogy would be that each test program is roughly equivalent to that of a cell within a living organism, then the test fragments would be analogous to chromosomes.) These test fragments are then strings of test cases that determine certain error conditions within the SUT. The test cases would then be analogous to a gene that would encode a particular trait.

The application of genetic reproduction techniques causes modifications in the test programs that are found to cause failures within the system under test 34. During reproduction, first occurs recombination or crossover of genes (i.e., test cases) from parent test programs that are combined to form new chromosomes (i.e., test fragments) comprised of the genes (i.e., test cases). From these test programs (i.e., cells), one can derive a new child test program that is substantially similar to the parent test programs that were found to cause errors in the system under test 34. There is also the situation that occurs when a newly created offspring test program can include mutations within the genes (i.e., test cases) that cause elements of the test case input data to be changed. These changes are mainly caused by creating errors that resemble the errors resulting from copying genes (i.e., test cases) from the parents. In these crossover and mutation situations the fitness of the organism is measured by the success of the organism in its life (i.e., the test program) to cause failures within the system under test 34.

The two basic parameters in a genetic algorithm that will be discussed are crossover probability and mutation probability. The crossover probability determines how often the crossover is performed. If there is no crossover, the offspring test program is an exact copy of the parent test program. If there is a crossover, the offspring test program is made from parts of the parents genes (or i.e., test cases). If the crossover probability is 100%, then all the offspring test programs are made by crossover. If the crossover probability is 0%, the entire new generation of test programs is made from exact copies of the test cases from the parent test programs. This crossover is made in the hope that the new test fragments comprising test cases will have good parts of the old test cases from the parent test programs and maybe create some new test fragments that will be better.

The mutation probability determines how often the parts of the chromosome (i.e., test fragments) will mutate. If there is no mutation, the offspring test program is taken after crossover without any change from the parent test cases. If mutation action is performed, a part of the chromosome (i.e., test fragment composed of test cases) is changed. If the mutation probability is 100%, the whole chromosome (i.e., test fragment) is changed, if it is 0%, nothing is changed with the chromosome (i.e., test fragment). A mutation action is made to prevent the genetic algorithm from falling into a local extreme. However, a mutation action should not occur very often, because the genetic algorithm will in fact change to a random generation. The description of the test program further comprised of test cases is herein described in further detail with regard to FIGS. 8A through 8F.

Next, the genetic test system requests the user to select the number of test programs (X) that are to make up the base generation (G=0) at step 63. The number of test programs (X) could be input by a user, randomly generated, or randomly generated within a range defined by the user. The execution of the random test program generation process 80 is performed at step 64. The random test program generation process 80 is herein defined in further detail with reference to FIG. 5.

After the random test program generation process 80 has created a random test program, the genetic test system 60 executes the random test program on the SUT 34 in step 65. Next, the genetic test system 60 checks if the random test program executed at step 65 has caused a failure in the execution of system under test 34 at step 66. If no failure was caused by the random test program, the genetic test system 60 then proceeds to step 71. If a failure was caused in the SUT 34, the genetic test system 60 retains the test program test cases that caused the error(s), for generation (G=0) in the genetic test database at step 67.

At step 68, the genetic test system 60 increments the number of randomly generated test programs executed (Y) by one. The genetic test system 60 next checks if the number of random generated test programs executed (Y) equals the number of randomly generated test programs (X) selected at step 63 at step 71. If the selected number of random test programs (X) have not been executed at step 71, the genetic test system 60 returns to step 64 to repeat steps 64 through 71.

If the selected number of test programs selected in step 63 have been executed at step 71, the random generation testing system 60 exits the random test case generation phase and indicates to the programmer to correct any errors in the SUT 34 that exist at step 72.

The genetic test system 60 next executes the genetic test system process at step 73. The genetic test system process is herein defined in further detail with regard to FIG. 6. After the execution of the genetic test system process, the genetic test system 60 exits at step 79.

Illustrated in FIG. 5 is the flow chart representing the random test program generation process 80 of the present invention. The random test program generation process 80 is first initialized at step 81. The initialization step 81 establishes the initial values and data structures in the random test program generation process 80.

The random test program generation process 80, selects the number is of test cases (Z) to be combined in a test program (Y) to be run. The random test program generation process 80 can utilize a random number generated within a selected range, or can accept input from the user at step 82.

The random test program generation process 80 next randomly selects a test case from the test case database 35 at step 83. At step 84, the random test program generation process 80 adds the test case selected from the test case database 35 to the (test program (Y) currently under construction).

At step 85, the random test program generation process 80 next tests if the number of test cases (Z) has been combined in the test program (Y) currently under construction. If the selected number of test cases have not been combined, the random test program generation process 80 returns to step 83 to randomly select the next test case from the test case database 35. If the random test program generation process 80 has selected the number of requested test cases (Z) at step 85, the random test generation process exits at step 89.

Illustrated in FIG. 6 is a flow chart representing the genetic test system process 90 of the present invention. The genetic test system process 90 is first initialized at step 91. The initialization step 91 establishes the initial values and data structures in the genetic test system process 90.

Next, the genetic test system process 90 requests the user to select the number of generations (G) to be executed at step 92. The number of generations (G) could be input by a user, randomly generated, or randomly generated within a range defined by the user. The genetic test system process 90 also sets the current number of generations executed (H) to zero (0) at step 92.

Then, the genetic test system process 90 determines the number of test programs (X) to be run at step 93. The number of test programs (X) to be run can either be selected by a user input or generated by a random number generator. The genetic test system process 90 also sets the current number of test programs (Y) executed to zero (0) at step 92.

The genetic test system process 90 executes the genetic test program generation process 110 at step 94. The genetic test program generation process 110 is herein defined in further detail with regard to FIG. 7. At step 95, the genetic test system process 90 then executes the genetic test program created by the genetic test program generation process 110 in step 94.

At step 96, after the genetic test program is executed at step 95, the genetic test system process 90 determines whether a failure in the system under test 34 has occurred. If a failure has been caused in the system under test 34 by the genetic test program, the genetic test system process 90 saves the test cases in the current genetic test program (Y) for the current generation (H) in the genetic test cases database 35 at step 97. The genetic test system process 90 then sets the generation of the current sequence of test programs to generation Y=Y+1 at step 101.

Next, the genetic-test system process 90 determines, at step 102, if the selected number of randomly generated genetic test programs executed (Y), in generation (H), equals the number of genetic test programs.(X) selected for each generation at step 93. If, at step 102, the genetic test system process 90 determines that the number of genetic test programs (X) have not been executed the genetic test system process 90 returns to step 94 to repeat steps 94 through 102.

If the selected number of test programs in generation (H) have been executed, the genetic test system process 90 then indicates to the user, if errors have been discovered during the most recent generation of test programs. The genetic test system process 90 advises the user to correct the errors in the system under test 34 at step 103.

Next, at step 104, the genetic test system process 90 determines if the current generation (H) is equal to the selected number of generations. The selected number of generations (G) is the number of generations that the genetic test system is to repeat. If the current generation is not the selected number of generations (G), the genetic test system process 90 returns to repeat steps 93 to 103. If the current generation is the selected number of generations (G) to be processed, the genetic test system process 90 exits at step 109. It is also contemplated by the inventors that a user may indicate that the genetic test system process 90 is to continue testing.

Illustrated in FIG. 7 is the genetic test program generation process 110 of the present invention. The genetic test program generation process 110 is first initialized at step 111. The initialization step 111 establishes the initial values and data structures in the genetic test program generation process 110.

The genetic test program generation process 110 selects the total number of test cases to be combined in a test program to be run at step 112. This total number of test cases to be run can either be obtained by utilizing a random number generator or by manual input provided by the programmer.

Next, at step 113, the genetic test program generation process 110 selects the number of test cases to be embodied in each program fragment that is to be included in the test program to be run at step 113. This number of test cases to be embodied in a test program fragment can either be selected through random number generation or by user manual input.

The genetic test program generation process 110 genetically selects, using a genetic algorithm, a test fragment from the test case database 35 level generation H-1 at step 114. The test fragment is added to the genetic test program at step 115. If the prior generation H-1 does not yield any failures and there are no fit parents in the previous generation, the genetic test program generation process 110 then searches back in the previous generations H-2, H-3, . . . 0 for parents. If the genetic test program generation process 110 finds none, then it uses the random test program generation in FIG. 5 to randomly generate a test program.

Next, at step 116, the genetic test program generation process 110 determines if the selected number of total test cases has been combined. If the selected number of test cases have not been combined in the genetic test program being generated, the genetic test program generation process 110 returns and repeats step 114 through 116. If the number of selected total test cases has been combined into the genetic test program being generated, the genetic test program generation process 110 then exits at step 119.

FIGS. 8A through 8F are block diagrams representative of examples of test programs and the test fragments within each program. As applied herein, a test case is defined to include input data to be processed by the system under test 34, and in some cases may include state data to place the system under test 34 into a particular state. A test fragment is the combination of a set of test cases. A test program is a collection of test fragments, each test fragment comprising a set of test cases.

FIG. 8A shows an example of generation 1, program 120 through program 150, generated utilizing the random test program generation process 80 for test programs in generation one (1).

The block diagrams 120, 130, 140 and 150 are representative of examples of parent generation test programs 120–150 including the test cases within each program. As shown, the parent test programs in generation 1 include a random sampling and content of test cases 121–126, 131–136, 141–146 and 151–156, in test programs 120,130, 140 and 150, respectively.

FIG. 8B is a block diagram representative of a child test program 160 generated from test cases included in parent test program 120 and parent test program 130 generated in generation one (1). As shown in FIG. 8B, the generation 2 test program 160 is created in a crossover operation. It is assumed for the purposes of this illustration that one test case in test program 120 through test program 150 in generation 1 created failures within the system under test 34. It is further shown that the test cases 161–163 and 164–166 are constructed within test fragments 167 and 168, respectively. These test fragments contain sequential test cases from the parent test cases. It is contemplated by the inventors that the test fragments can be of any predetermined, or randomly chosen number that is less then the total number of selected test cases.

Illustrated in FIG. 8C is a block diagram representative of a generation 2 child test program 170 inheriting test cases 171–173 and 174–176 in test fragments 177 and 178, from parent test program 130 and test program 120, respectively. The test cases genetically generated in the test fragments are randomly assembled.

Illustrated in FIG. 8D is generation 2 test program 180 that inherits test fragments from parent test program 140, test program 130, and test program 120. It is meant to be illustrated in this example that a child test program 180 is randomly constructed from test cases in numerous parent programs and their respective test fragments are randomly put together.

Illustrated in FIG. 8E is a block diagram representative of generation 2 of the child test program 190 inheriting test cases 191 & 192, 193–194, and 195–197 in test fragments 198–200, respectively, from parent test program 150 and test program 120. The example illustrated in FIG. 8E illustrates that the length of the test cases from each parent need not be equal or evenly distributed in the test fragments.

Illustrated in FIG. 8F is a block diagram representative of a child test program inheriting test cases from parent test program 130, test program 120, and test program 150 including mutations in the test cases of test fragments 218 and 219.

The genetic test system is a program, or set of programs, which comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical).

Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a. computer memory.

The foregoing description has been presented for purposes of illustration and description. It is not intended to be exhaustive or to limit the invention to the precise forms disclosed. Obvious modifications or variations are possible in light of the above teachings.

The embodiment or embodiments discussed were chosen and described to provide the best illustration of the principles of the invention and its practical application to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method to analyze a computer system under test, said computer system including a plurality of instructions, the method comprising the steps of:

creating a plurality of test programs, each of said test programs including a plurality of test cases;

testing said computer system under test by executing said computer system under test using each of said plurality of test programs as input data and saving any of said plurality of test programs that cause said computer system under test to fail during said execution;

selecting a pre-determined number of generations for which to perform generation tests on said computer system under test;

performing said generation tests on said computer system under test for the predetermined number of generations selected, wherein said performing comprises:

generating a plurality of new generation test programs, each new generation test program including a plurality of test cases saved when one of said plurality of test programs caused said computer system under test to fail during execution; and combining a plurality of test fragments for each new generation test program, each of said plurality of test fragments including a predetermined number of test cases saved from said test programs that caused said computer system under test to fail during execution.

2. The method of claim 1, wherein the combining step further comprises the steps of:

determining a crossover probability that determines a ratio of test fragments created from at least one of said test programs that caused said computer system under test to fail during execution; and determining a mutation probability that determines a ratio of test fragments that are randomly changed in said plurality of test fragments combined for each new generation test program.

3. The method of claim 1, wherein the combining step further comprises the step of:

selecting the number of test fragments to be combined for each new generation test program.

4. The method of claim 1, wherein the combining step further comprises the step of:

selecting the number of test cases to be combined in each of said plurality of test fragments for each new generation test program.

5. The method of claim 1, wherein the performing step further comprises the steps of:

next generation testing of said computer system under test, said next generation testing further comprising the steps of:

executing said computer system under test, said computer system under test using one of said plurality of new generation test pro(grams as input data;

saving a plurality of new generation test cases included in said one of said plurality of new generation test programs that cause said computer system under test to fail during execution; and repeating said next generation testing step a predetermined number of times using a different one of said plurality of new generation test programs as input data for each testing.

6. The method of claim 5, wherein the performing step further comprises the step of:

generating a plurality of newer generation test programs, each one of said newer generation test programs including a plurality of newer generation test cases from said plurality of new generation test cases saved when said plurality of new generation test programs caused said computer system under test to fail during execution.

7. An apparatus for analyzing a computer system, said computer system including a plurality of instructions, said analysis apparatus comprising:

means for creating a plurality of test programs, each of said test programs including a plurality of test cases;

means for testing said computer system under test by executing said computer system under test using each of said plurality of test programs as input data and saving any of said plurality of test programs that caused said computer system under test to fail during said execution;

means for selecting a pre-determined number of generations for which to perform generation tests on said computer system under test;

means for performing said generation tests on said computer system under test for the pre-determined number of generations selected, wherein said means for performing comprises:

means for generating a plurality of new generation test programs, each new generation test program including a plurality of test cases saved when one said plurality of test programs caused said computer system under test to fail during execution; and means for combining a plurality of test fragments for each new generation test program, each of said plurality of test fragments including a predetermined number of test cases saved from said test programs that caused said computer system under test to fail during execution.

8. The apparatus of claim 7, wherein said combining means further comprises:

means for determining a crossover probability that determines a ratio of test fragments created from at least one of said test programs that caused said computer system under test to fail during execution; and means for determining a mutation probability that determines a ratio of test fragments that are randomly changed in said plurality of test fragments combined for each new generation test program.

9. The apparatus of claim 7, wherein said combining means further comprises:

means for determining a number of test fragments to be combined for each new generation test program.

10. The apparatus of claim 7, wherein said combining means further comprises:

means for determining a number of test cases to be combined in each of said plurality of test fragments for each new generation test program.

11. The apparatus of claim 7, wherein the means for performing step further comprises:

means for next generation testing of said computer system under test, said next generation testing means further comprising:

means for executing said computer system under test using one of said plurality of new generation test programs as input data;

means for saving a plurality of new generation test cases included in said one of said plurality of new generation test programs that cause said computer system under test to fail during execution; and means for repeating said next generation testing means for a predetermined number of times using a different one of said plurality of new generation test programs as input data for each testing.

12. The apparatus of claim 7, wherein the means for performing further comprises:

means for generating a plurality of newer generation test programs, each one of said newer generation test programs including a newer generation of a plurality of test cases from said plurality of new generation test cases saved when said plurality of new generation test programs caused said computer system under test to fail during execution.

13. A computer readable medium having a program for testing a computer system, the program comprising:

logic configured to create a plurality of test programs, each of said test programs including a plurality of test cases;

logic configured to test said computer system under test by executing said computer system under test using each of said plurality of test programs as input data and saving any of said plurality of test programs that cause said computer system under test to fail during said execution;

logic configured to select a pre-determined number of generations for which to perform generation tests on said computer system under test; and logic configured to perform said generation tests on said computer system under test for the pre-determined number of generations selected, wherein said logic configured to perform comprises:

logic configured to generate a plurality of new generation test programs by combining a plurality of test fragments in each new generation test program, each of said plurality of test fragments includes a predetermined number of test cases saved from said test programs that caused said computer system under test to fail during execution;

logic configured to retest said computer system under test, said retest logic further comprising:

retesting processor logic configured to execute said computer system under test, said computer system under test using one of said plurality of new generation test programs as input data;

resaving logic configured to save a plurality of test cases included in said one of said plurality of new generation test programs that cause said computer system under test to fail during execution; and logic configured to repeat said retest logic a predetermined number of times using a different one of said plurality of new generation test programs as input data for each testing.

14. The computer system testing program of claim 13, wherein the logic configured to generate comprises:

logic configured to determine a crossover probability that ascertains a ratio of said test fragments created from at least one of said test programs that caused said computer system under test to fail during execution; and logic configured to determine a mutation probability that ascertains a ratio of said test fragments that are randomly changed in said plurality of test fragments combined for said new generation test program.

15. The computer system testing program of claim 14, wherein the logic configured to perform further comprises:

newer generation logic configured to generate a newer generation test program combining a plurality of new generation test fragments in a new generation test program, each of said plurality of new generation test fragments includes a predetermined number of test cases saved from said new generation test programs that caused said computer system under test to fail during execution;

newer generation testing processor logic configured to execute said computer system under test, said computer system under test using one of a plurality of newer generation test programs as input data;

newer generation saving logic configured to save said plurality of test cases included in said one of plurality of newer generation test programs that cause said computer system under test to fail during execution; and logic configured to repeat said newer generation test logic a predetermined number of times using a different one of said plurality of newer generation test programs as input data for each testing.

16. The computer system testing program of claim 13, wherein the logic configured to perform further comprises:

logic configured to determine a number of test fragments to be combined for each of said new generation test programs; and logic configured to determine a number of test cases to be combined in each of said plurality of test fragments for each of said new generation test programs.

* * * * *